United States Patent
Leary et al.

(10) Patent No.: US 10,119,406 B2
(45) Date of Patent: Nov. 6, 2018

(54) BLADE WITH STRESS-REDUCING BULBOUS PROJECTION AT TURN OPENING OF COOLANT PASSAGES

(71) Applicant: General Electric Company, Schenectady, NY (US)

(72) Inventors: Brendon James Leary, Simpsonville, SC (US); Elisabeth Kraus Black, Greenville, SC (US); Gregory Thomas Foster, Greer, SC (US); Michelle Jessica Iduate, Simpsonville, SC (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 681 days.

(21) Appl. No.: 15/152,698

(22) Filed: May 12, 2016

(65) Prior Publication Data

US 2017/0328219 A1   Nov. 16, 2017

(51) Int. Cl.
*F01D 5/18* (2006.01)
*F01D 9/04* (2006.01)
*F01D 25/12* (2006.01)

(52) U.S. Cl.
CPC .......... *F01D 5/187* (2013.01); *F01D 9/041* (2013.01); *F01D 25/12* (2013.01); *F05D 2220/32* (2013.01); *F05D 2240/12* (2013.01); *F05D 2240/30* (2013.01); *F05D 2250/75* (2013.01); *F05D 2260/22141* (2013.01); *F05D 2260/941* (2013.01); *Y02T 50/676* (2013.01)

(58) Field of Classification Search
CPC .......... F01D 5/187; F01D 9/041; F01D 25/12; F05D 2220/32; F05D 2240/12; F05D 2240/30; F05D 2250/75; F05D 2260/22141; F05D 2260/941; Y02T 50/676

See application file for complete search history.

(56) References Cited

U.S. PATENT DOCUMENTS

| | | | | |
|---|---|---|---|---|
| 5,073,086 A | * | 12/1991 | Cooper | F01D 5/187 416/96 R |
| 6,595,750 B2 | * | 7/2003 | Parneix | F01D 5/187 416/97 R |
| 7,137,780 B2 | * | 11/2006 | Liang | F01D 5/187 416/90 R |

(Continued)

*Primary Examiner* — Igor Kershteyn
(74) *Attorney, Agent, or Firm* — Ernest G. Cusick; Hoffman Warnick LLC

(57) ABSTRACT

A blade includes an airfoil defined by a pressure side outer wall and a suction side outer wall connecting along leading and trailing edges and forming a radially extending coolant receiving chamber. A rib partitions the radially extending chamber into a first passage on a first side of the rib and an adjacent second passage on an opposing second side of the rib. Each passage is enclosed at an end of the radially extending chamber by an end member of the radially extending chamber. A turn opening is defined in an end of the rib through which the coolant passes between the first passage and the second passage within the end member of the radially extending chamber. A bulbous projection extends along the end of the rib and on opposing radially extending sides of the turn opening to reduce stress in the rib and/or connecting fillets.

20 Claims, 15 Drawing Sheets

(56) References Cited

U.S. PATENT DOCUMENTS

| | | | | |
|---|---|---|---|---|
| 7,431,562 B2* | 10/2008 | Hooper | ............... | F01D 5/187 416/97 R |
| 8,052,389 B2* | 11/2011 | Kopmels | ............. | F01D 5/147 416/233 |
| 2006/0280606 A1* | 12/2006 | Busbey | ............... | F01D 5/187 416/97 R |
| 2007/0104576 A1* | 5/2007 | Cunha | .................. | B22C 9/04 416/97 R |
| 2008/0145234 A1* | 6/2008 | Lee | .................... | B22C 9/103 416/96 R |
| 2011/0243717 A1* | 10/2011 | Gleiner | ............... | F01D 5/187 415/177 |
| 2015/0110639 A1* | 4/2015 | Herzlinger | ........... | F01D 5/18 416/96 R |
| 2015/0184519 A1 | 7/2015 | Foster et al. | | |

* cited by examiner

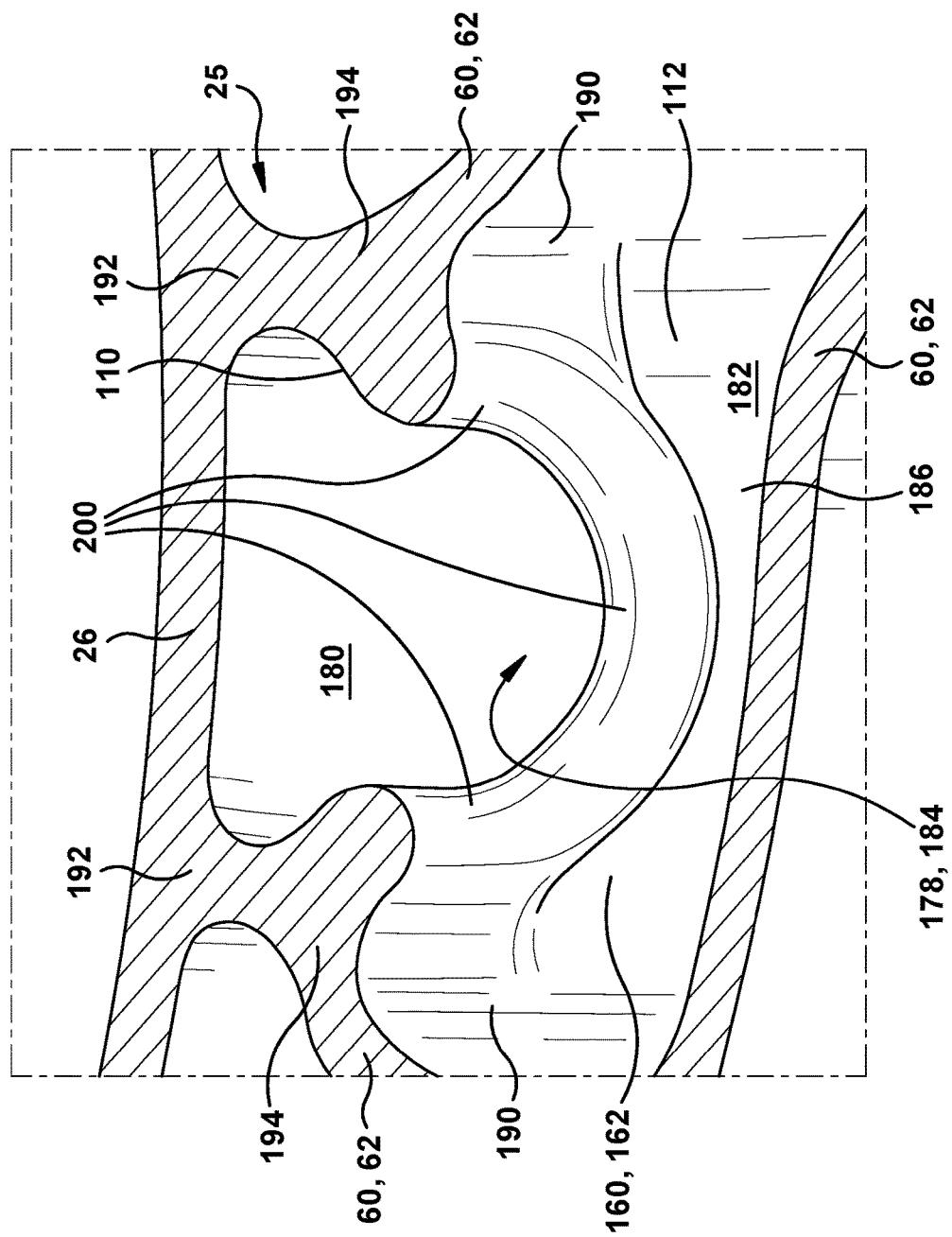

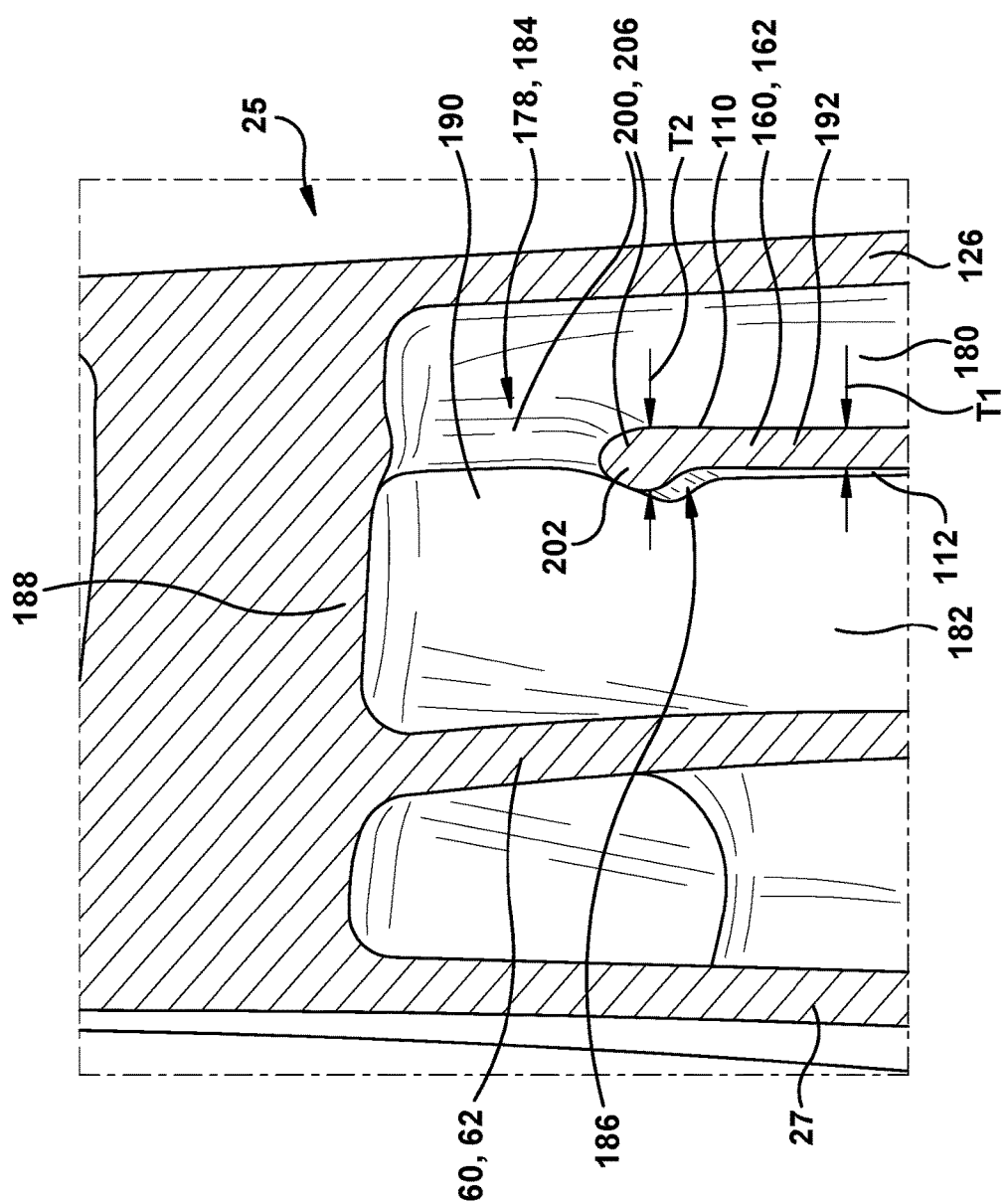

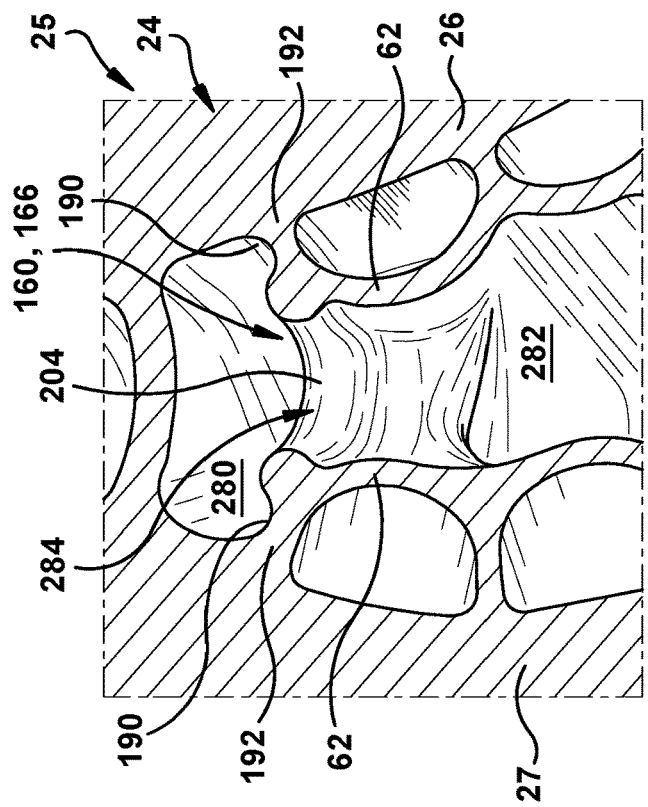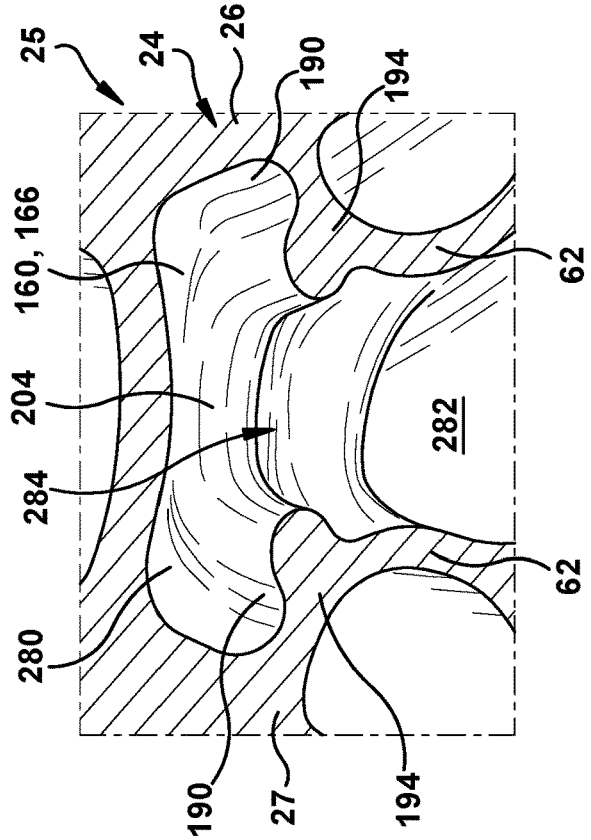

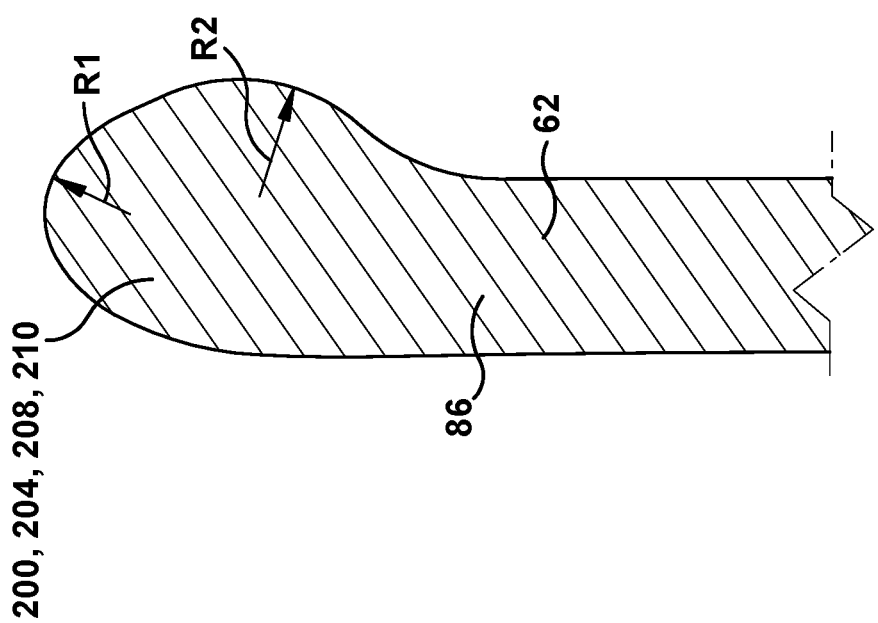

BLADE WITH STRESS-REDUCING BULBOUS PROJECTION AT TURN OPENING OF COOLANT PASSAGES

BACKGROUND OF THE INVENTION

This disclosure relates to turbine airfoils, and more particularly to hollow turbine airfoils, such as rotor or stator blades, having internal channels for passing fluids such as air to cool the airfoils.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passages or circuits that form a cooling system through which a coolant, typically air bled from the compressor, is circulated. Such cooling circuits are typically formed by internal ribs that provide the required structural support for the airfoil, and include multiple flow path arrangements to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable turbine blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil arrangements that offer internal airfoil configurations and coolant circulation that improves coolant efficiency.

A consideration that further complicates arrangement of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passages defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement. A challenge with the near-wall flow passages is that the outer walls experience a significantly greater level of thermal expansion than the inner walls. This imbalanced growth causes stress to develop at the points at which the inner ribs connect, which may cause low cyclic fatigue that can shorten the life of the blade.

BRIEF DESCRIPTION OF THE INVENTION

A first aspect of the disclosure provides a blade comprising an airfoil defined by a concave pressure side outer wall and a convex suction side outer wall that connect along leading and trailing edges and, therebetween, form a radially extending chamber for receiving the flow of a coolant, the blade further comprising: a rib configuration including: a rib partitioning the radially extending chamber into a first passage on a first side of the rib and an adjacent second passage on an opposing second side of the rib, each passage enclosed at an end of the radially extending chamber by an end member of the radially extending chamber; and a turn opening defined in an end of the rib through which the coolant passes between the first passage and the second passage within the end member of the radially extending chamber; and a bulbous projection extending along the end of the rib and on opposing radially extending sides of the turn opening.

A second aspect of the disclosure provides a turbine rotor blade comprising an airfoil defined by a concave pressure side outer wall and a convex suction side outer wall that connect along leading and trailing edges and, therebetween, form a radially extending chamber for receiving the flow of a coolant, the turbine rotor blade further comprising: a rib configuration including: a rib configuration including: a rib partitioning the radially extending chamber into a first passage on a first side of the rib and an adjacent second passage on an opposing second side of the rib, each passage enclosed at an end of the radially extending chamber by an end member of the radially extending chamber; a turn opening defined in an end of the rib through which the coolant passes between the first passage and the second passage within the end member of the radially extending chamber; and a bulbous projection extending along the end of the rib and on opposing radially extending sides of the turn opening.

The illustrative aspects of the present disclosure are arrangements to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 9 shows an enlarged cross-sectional perspective view of a rib configuration and a bulbous projection according to embodiments of the disclosure taken partially along line AA in FIG. 4.

FIG. 10 shows an enlarged cross-sectional perspective view of a rib configuration and a bulbous projection according to embodiments of the disclosure taken along line EE in FIG. 4.

FIG. 11 shows an enlarged cross-sectional perspective view of a rib configuration and a bulbous projection according to embodiments of the disclosure taken partially along line FF in FIG. 4.

FIG. 12 shows another enlarged cross-sectional perspective view of a rib configuration and a bulbous projection according to embodiments of the disclosure taken partially along line FF in FIG. 4.

FIG. 14 shows an enlarged cross-sectional view of an embodiment of a bulbous projection as may be employed in any of the embodiments described herein.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Figure 1:
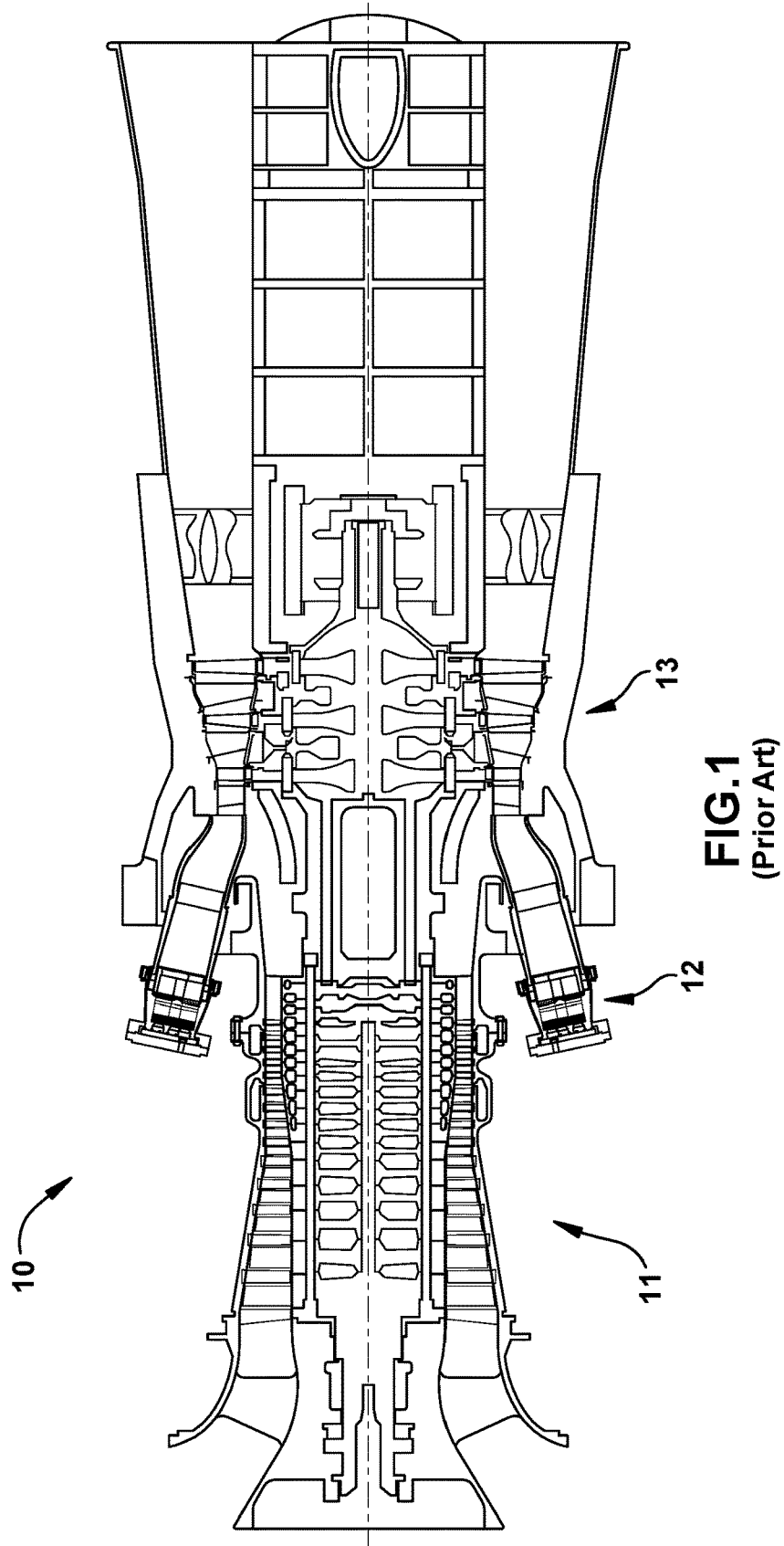
FIG. 1 is a schematic representation of an illustrative turbine engine in which certain embodiments of the present application may be used.
Figure 2:
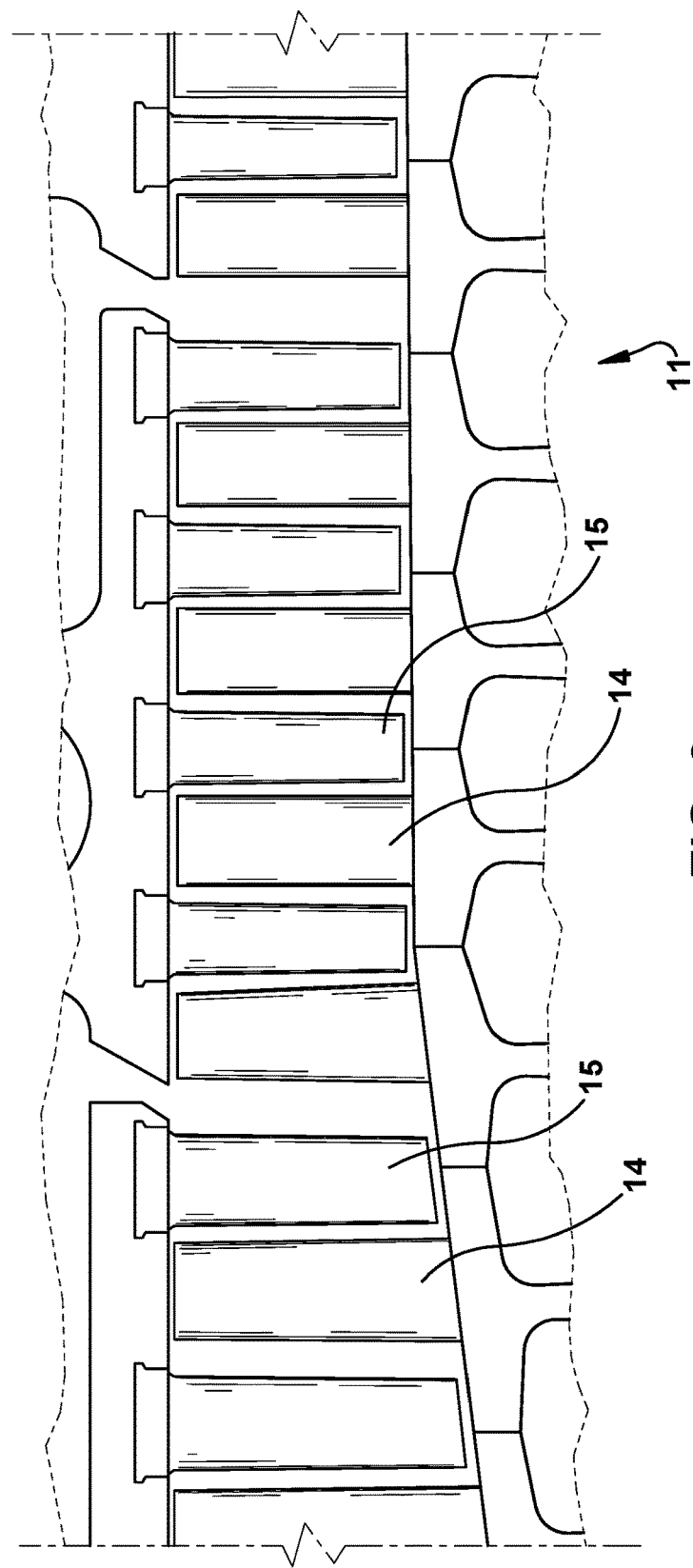
FIG. 2 is a cross-sectional view of the compressor section of the combustion turbine engine of FIG. 1.
Figure 3:
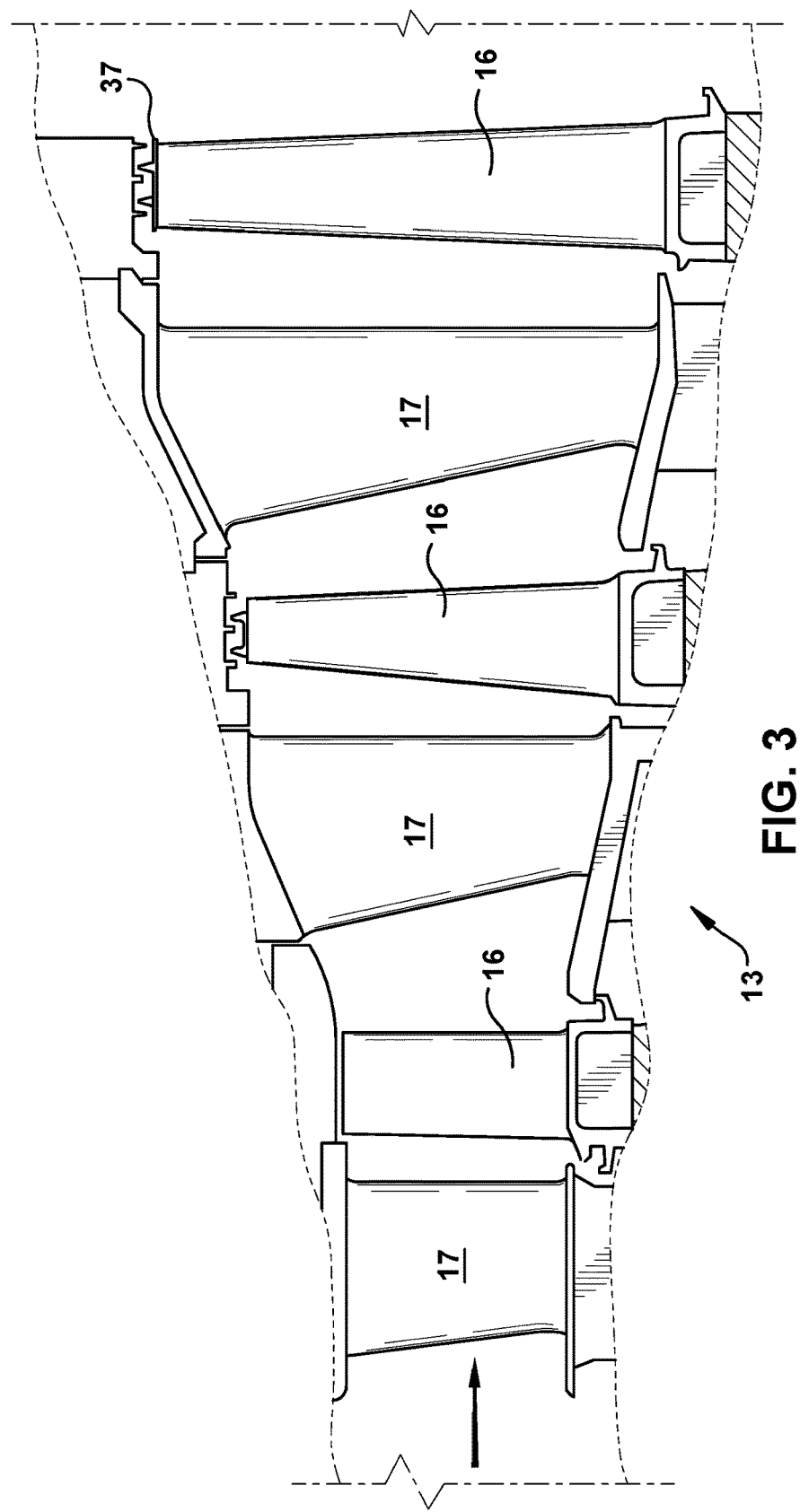
FIG. 3 is a cross-sectional view of the turbine section of the combustion turbine engine of FIG. 1.

By way of background, referring now to the figures, FIGS. 1-3 illustrate an example combustion turbine engine in which embodiments of the present application may be used. It will be understood by those skilled in the art that the present disclosure is not limited to this particular type of usage. The present disclosure may be used in combustion turbine engines, such as those used in power generation, airplanes, as well as other engine turbomachine types. The examples provided are not meant to be limiting unless otherwise stated.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between compressor 11 and turbine 13.

FIG. 2 illustrates a view of an illustrative multi-staged axial compressor 11 that may be used in the combustion turbine engine of FIG. 1. As shown, compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an illustrative turbine section or turbine 13 that may be used in the combustion turbine engine of FIG. 1. Turbine 13 may include a plurality of stages. Three illustrative stages are shown, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. Turbine stator blades 17 generally are circumferentially spaced one from the other and fixed about the axis of rotation. Turbine rotor blades 16 may be mounted on a turbine wheel (not shown) for rotation about the shaft (not shown). A second stage of turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that turbine stator blades 17 and turbine rotor blades 16 lie in the hot gas path of the turbine 13. The direction of flow of the hot gases through the hot gas path is indicated by the arrow. As one of ordinary skill in the art will appreciate, turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within axial compressor 11 may compress a flow of air. In combustor 12, energy may be released when the compressed air is mixed with a fuel and ignited. The resulting flow of hot gases from combustor 12, which may be referred to as the working fluid, is then directed over turbine rotor blades 16, the flow of working fluid inducing the rotation of turbine rotor blades 16 about the shaft. Thereby, the energy of the flow of working fluid is transformed into the mechanical energy of the rotating blades and, because of the connection between the rotor blades and the shaft, the rotating shaft rotates. The mechanical energy of the shaft may then be used to drive the rotation of the compressor rotor blades 14, such that the necessary supply of compressed air is produced, and also, for example, a generator to produce electricity.

Figure 4:
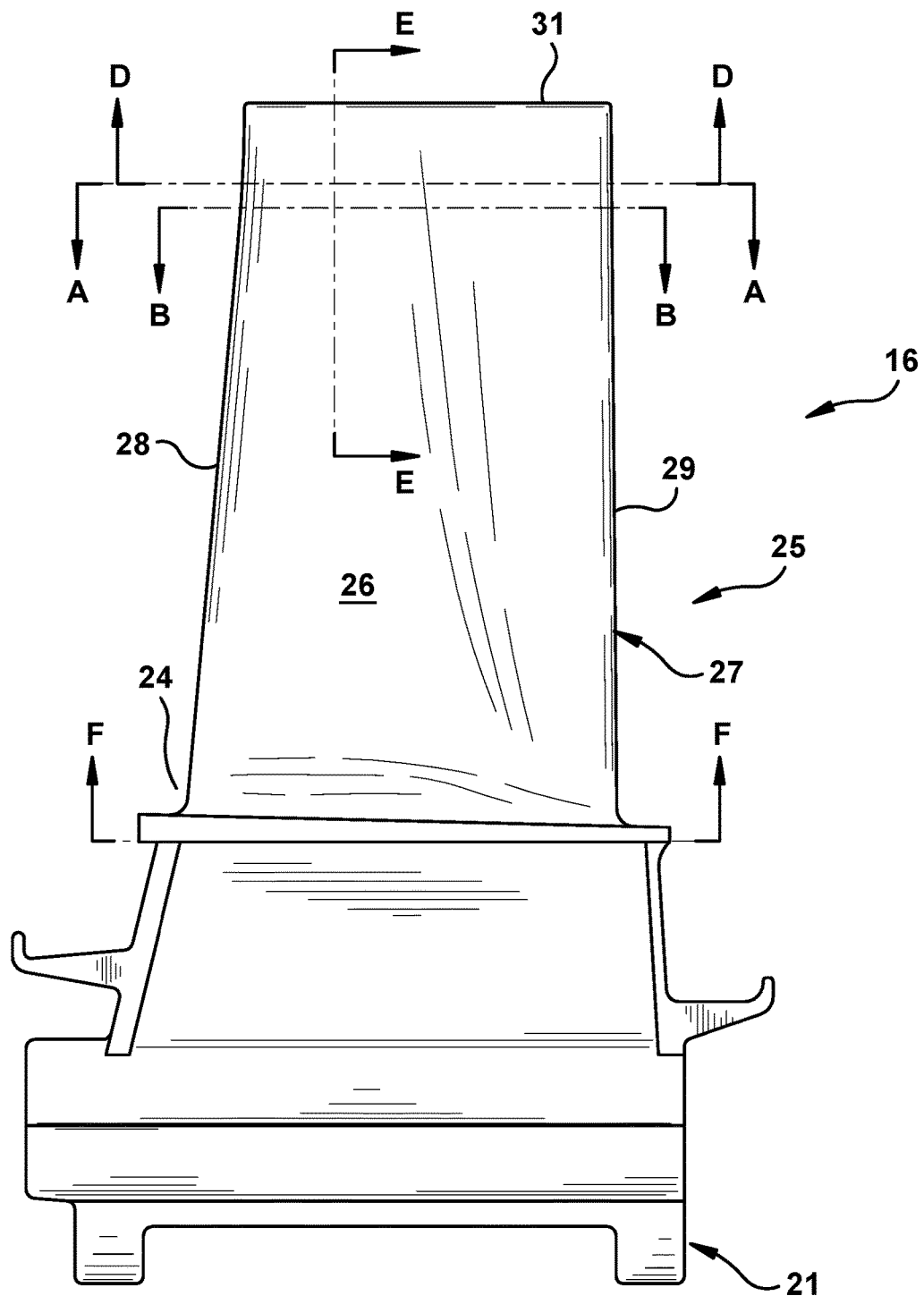
FIG. 4 is a perspective view of a turbine rotor blade of the type in which embodiments of the present disclosure may be employed.

FIG. 4 is a side perspective view of a turbine rotor blade 16 of the type in which embodiments of the present disclosure may be employed. Turbine rotor blade 16 includes a root 21 by which rotor blade 16 attaches to a rotor disc. Root 21 may include a dovetail (not shown) configured for mounting in a corresponding dovetail slot in the perimeter of the rotor disc. Root 21 may further include a shank that extends between the dovetail and a platform 24, which is disposed at the junction of airfoil 25 and root 21 and defines a portion of the inboard boundary of the flow path through turbine 13. It will be appreciated that airfoil 25 is the active component of rotor blade 16 that intercepts the flow of working fluid and induces the rotor disc to rotate. While the blade of this example is a turbine rotor blade 16, it will be appreciated that the present disclosure also may be applied to other types of blades within turbine engine 10, including turbine stator blades 17 (vanes). It will be seen that airfoil 25 of rotor blade 16 includes a concave pressure side (PS) outer wall 26 and a circumferentially or laterally opposite convex suction side (SS) outer wall 27 extending axially between opposite leading and trailing edges 28, 29 respectively. Sidewalls 26 and 27 also extend in the radial direction from platform 24 to an outboard tip 31. (It will be appreciated that the application of the present disclosure may not be limited to turbine rotor blades, but may also be applicable to stator blades (vanes). The usage of rotor blades in the several embodiments described herein is merely illustrative unless otherwise stated.) FIG. 4 also includes a number of cross-section indicator lines AA, BB, DD, EE and FF that will be referenced herein for purposes of describing the internal rib configurations and teachings of the disclosure.

Figure 5:
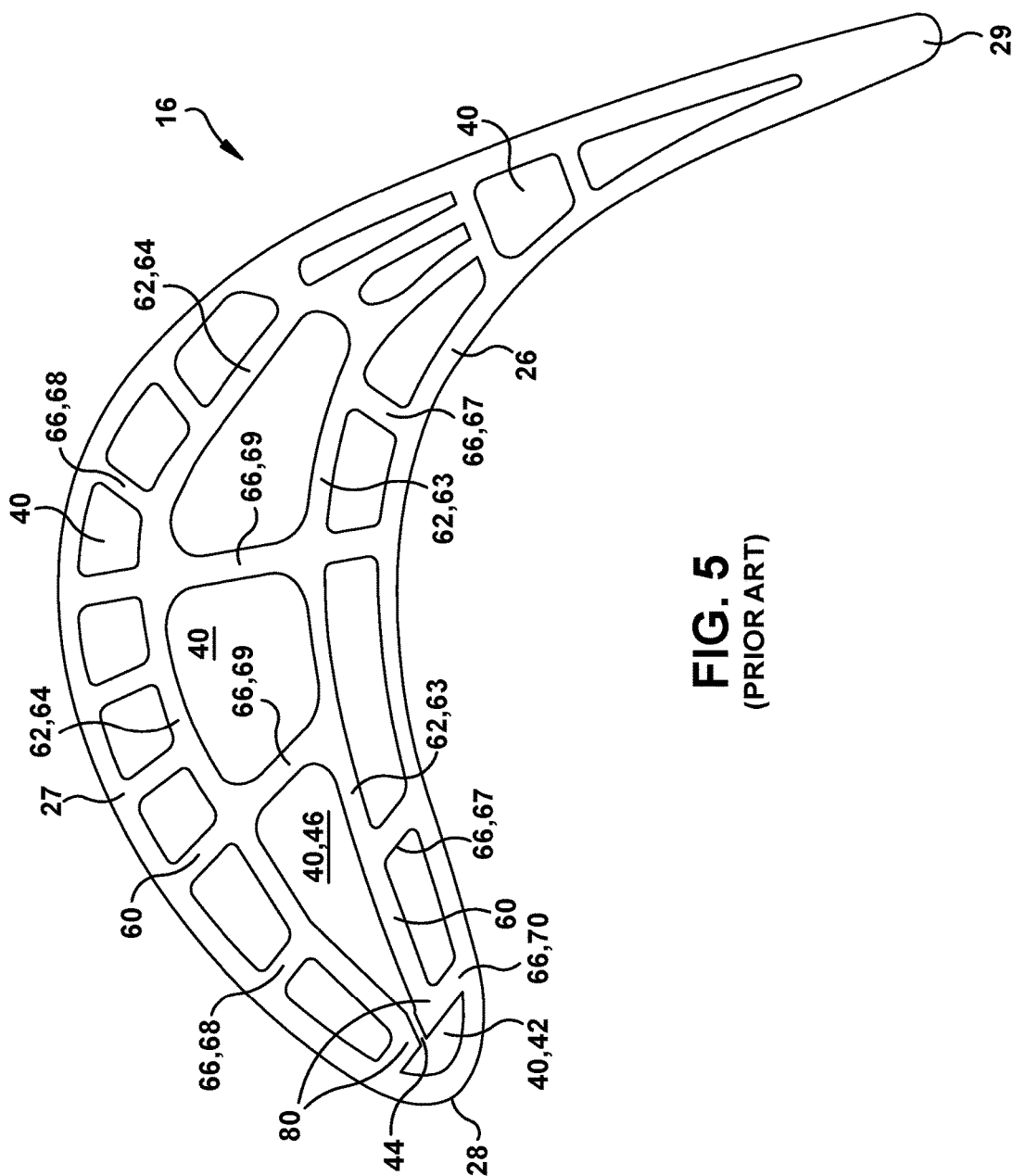
FIG. 5 is a cross-sectional view of a turbine rotor blade having an inner wall or rib configuration according to a conventional arrangement.
Figure 6:
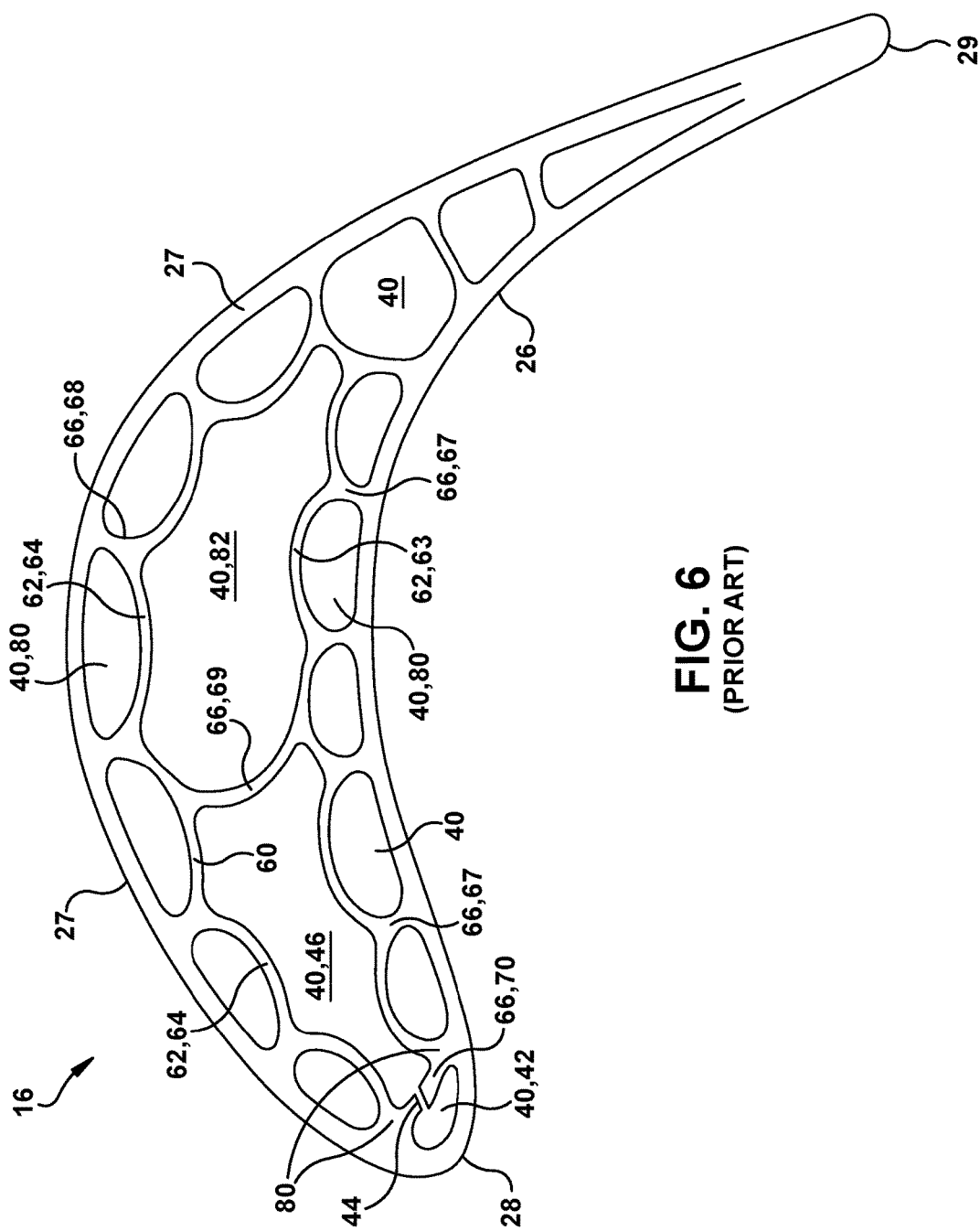
FIG. 6 is a cross-sectional view of a turbine rotor blade having a rib configuration according to a conventional arrangement.

FIGS. 5 and 6 show two example internal wall constructions as may be found in a rotor blade airfoil 25 having a conventional arrangement as may be observed, for example, along line BB in FIG. 4. As indicated, an outer surface of airfoil 25 may be defined by a relatively thin pressure side (PS) outer wall 26 and suction side (SS) outer wall 27, which may be connected via a plurality of radially extending and intersecting ribs 60. Ribs 60 are configured to provide structural support to airfoil 25, while also defining a plurality of radially extending and substantially separated flow passages 40. Typically, ribs 60 extend radially so to partition flow passages 40 over much of the radial height of airfoil 25, but the flow passage may be connected along the periphery of the airfoil so to define a cooling circuit. That is, flow passages 40 may fluidly communicate at the outboard or inboard edges of airfoil 25, as well as via a number of smaller crossover passages 44 or impingement apertures (latter not shown) that may be positioned therebetween. In this manner certain of flow passages 40 together may form a winding or serpentine cooling circuit. Additionally, film cooling ports (not shown) may be included that provide outlets through which coolant is released from flow passages 40 onto outer surface of airfoil 25.

Ribs 60 may include two different types, which then, as provided herein, may be subdivided further. Each rib 60 partitions the radially extending chamber into at least a first passage 40 on one side of the rib and a second passage 40 on the opposing side of the rib. Some ribs 60 may form more than two passages 40. A first type, a camber line rib 62, is typically a lengthy rib that extends in parallel or approximately parallel to the camber line of the airfoil, which is a reference line stretching from a leading edge 28 to a trailing edge 29 that connects the midpoints between pressure side outer wall 26 and suction side outer wall 27. As is often the case, the illustrative conventional configuration of FIGS. 5 and 6 include two camber line ribs 62, a pressure side camber line rib 63, which also may be referred to as the pressure side outer wall given the manner in which it is offset from and close to the pressure side outer wall 26, and a suction side camber line rib 64, which also may be referred to as the suction side outer wall given the manner in which it is offset from and close to the suction side outer wall 27. As mentioned, these types of arrangements are often referred to as having a "four-wall" configuration due to the prevalent four main walls that include two outer walls 26, 27 and two camber line ribs 63, 64. It will be appreciated that outer walls 26, 27 and camber line ribs 62 may be formed using any now known or later developed technique, e.g., via casting or additive manufacturing as integral components.

The second type of rib is referred to herein as a traverse rib 66. Traverse ribs 66 are the shorter ribs that are shown connecting the walls and inner ribs of the four-wall configuration. As indicated, the four walls may be connected by a number of traverse ribs 66, which may be further classified according to which of the walls each connects. As used herein, traverse ribs 66 that connect pressure side outer wall 26 to pressure side camber line rib 63 are referred to as pressure side traverse ribs 67. Traverse ribs 66 that connect suction side outer wall 27 to suction side camber line rib 64 are referred to as suction side traverse ribs 68. Transverse ribs 66 that connect pressure side camber line rib 63 to suction side camber line rib 64 are referred to as center traverse ribs 69. Finally, a transverse rib 66 that connects pressure side outer wall 26 and suction side outer wall 27 near leading edge 28 is referred to as a leading edge transverse rib 70. Leading edge transverse rib 70, in FIGS. 5 and 6, also connects to a leading edge end of pressure side camber line rib 63 and a leading edge end of suction side camber line rib 64.

As leading edge transverse rib 70 couples pressure side outer wall 26 and suction side outer wall 27, it also forms passage 40 referred to herein as a leading edge passage 42. Leading edge passage 42 may have similar functionality as other passages 40, described herein. As illustrated, as an option and as noted herein, a crossover passage 44 may allow coolant to pass to and/or from leading edge passage 42 to an immediately aft central passage 46. Cross-over port 44 may include any number thereof positioned in a radially spaced relation between passages 40, 42.

In general, the purpose of any internal configuration in an airfoil 25 is to provide efficient near-wall cooling, in which the cooling air flows in channels adjacent to outer walls 26, 27 of airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such arrangements are prone to experiencing low cycle fatigue due to differing levels of thermal expansion experienced within airfoil 25, which, ultimately, may shorten the life of the rotor blade. For example, in operation, suction side outer wall 27 thermally expands more than suction side camber line rib 64. This differential expansion tends to increase the length of the camber line of airfoil 25, and, thereby, causes stress between each of these structures as well as those structures that connect them. In addition, pressure side outer wall 26 also thermally expands more than the cooler pressure side camber line rib 63. In this case, the differential tends to decrease the length of the camber line of airfoil 25, and, thereby, cause stress between each of these structures as well as those structures that connect them. The oppositional forces within the airfoil that, in the one case, tends to decrease the airfoil camber line and, in the other, increase it, can lead to stress concentrations. The various ways in which these forces manifest themselves given an airfoil's particular structural configuration and the manner in which the forces are then balanced and compensated for becomes a significant determiner of the part life of rotor blade 16.

More specifically, in a common scenario, suction side outer wall 27 tends to bow outward at the apex of its curvature as exposure to the high temperatures of the hot gas path cause it to thermally expand. It will be appreciated that suction side camber line rib 64, being an internal wall, does not experience the same level of thermal expansion and, therefore, does not have the same tendency to bow outward. That is, camber line rib 64 and transverse ribs 66 and their connection points resists the thermal growth of the outer wall 27.

Conventional arrangements, an example of which is shown in FIG. 5, have camber line ribs 62 formed with stiff geometries that provide little or no compliance. The resistance and the stress concentrations that result from it can be substantial. Exacerbating the problem, transverse ribs 66 used to connect camber line rib 62 to outer wall 27 may be formed with linear profiles and generally oriented at right angles in relation to the walls that they connect. This being the case, transverse ribs 66 operated to basically hold fast the "cold" spatial relationship between the outer wall 27 and the camber line rib 64 as the heated structures expand at significantly different rates. The little or no "give" situation prevents defusing the stress that concentrates in certain regions of the structure. The differential thermal expansion results in low cycle fatigue issues that shorten component life.

Many different internal airfoil cooling systems and rib configurations have been evaluated in the past, and attempts have been made to rectify this issue. One such approach proposes overcooling outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional arrangement in light of how airfoils grow thermally during operation. As shown in one example in FIG. 6, another approach employs certain curving or bubbled or sinusoidal or wavy internal ribs (hereinafter "wavy ribs") that alleviate imbalanced thermal stresses that often occur in the airfoil of turbine blades. These structures reduce the stiffness of the internal structure of airfoil 25 so to provide targeted flexibility by which stress concentrations are dispersed and strain off-loaded to other structural regions that are better able to withstand it. This may include, for example, off-loading stress to a region that spreads the strain over a larger area, or, perhaps, structure that offloads tensile stress for a compressive load, which is typically more preferable. In this manner, life-shortening stress concentrations and strain may be avoided.

Figure 7:
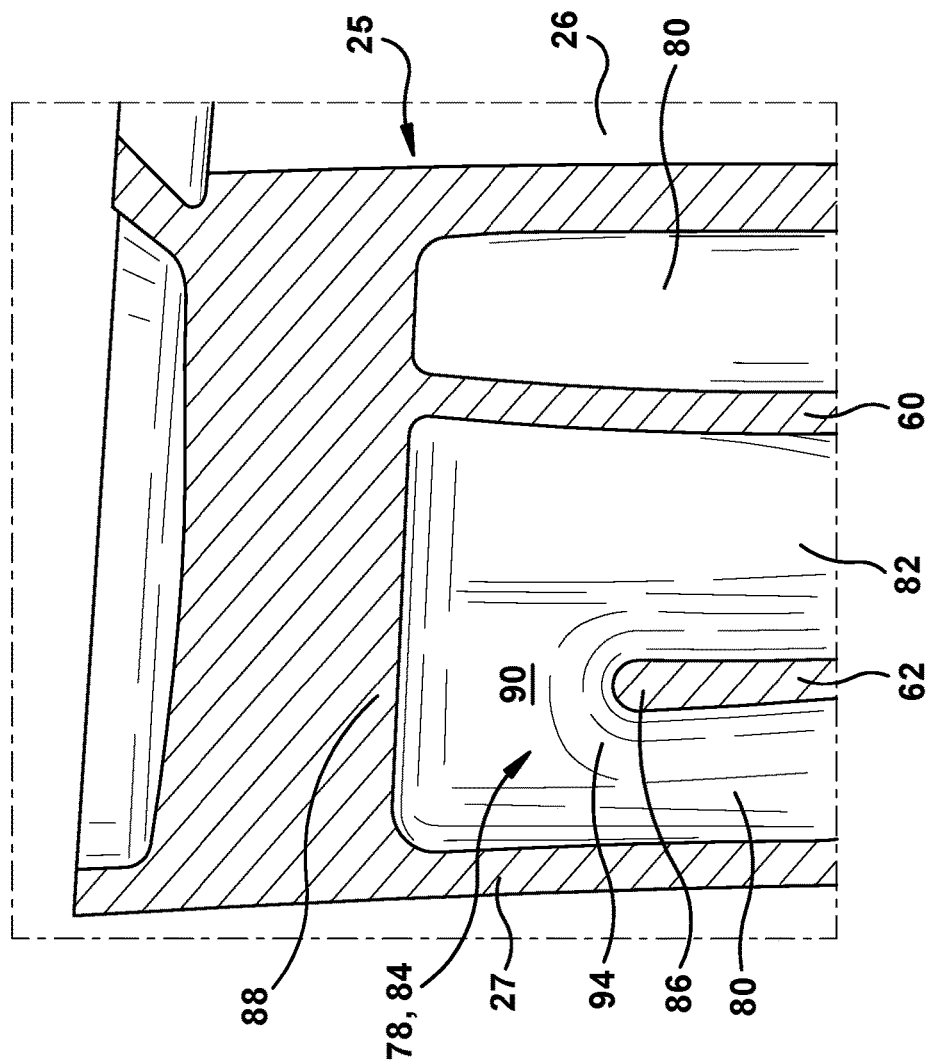
FIG. 7 shows an enlarged cross-sectional perspective view of a conventional rib configuration taken along line EE in FIG. 4.

However, despite the above arrangements, a high stress area may still result at turns between certain passages 40. In particular, multi-wall turbine blade cooling arrangements generally use smaller passages 40 near outer walls 26, 27 of airfoil 26 in order to utilize less cooling flow, but still maintain enough velocity for effective cooling to occur. The remainder of the blade internal passages 40 are usually low cooling effectiveness regions. These low cooling effectiveness regions are either shielded from the high heat load regions by the "near wall cooling" passages, or are placed facing very low heat load faces on the blade (whether by the nature of the external flow or because of applied film). FIG. 7 shows an enlarged cross-sectional perspective view of a turn 78 (2 shown) between camber line ribs 62 along line EE of FIG. 4. As shown in FIGS. 6 and 7, camber line ribs 62 can partition the radially extending chamber within airfoil 25 into an outer passage 80 on one side thereof adjacent one of outer walls 26, 27 (27 as shown in FIG. 7) and an inner passage 82 on an opposing side thereof. As shown in FIG. 7, turns 78 each include a turn opening 84 in an end 86 of each rib 62 formed by camber line rib 62 stopping short of an end member 88 of the radially extending chamber. In one example, coolant may pass from outer passage(s) 80 over end 86 of each camber line rib 62 into inner passage 82. End 86 may be rounded, i.e., with a single radius of curvature to assist coolant flow between passages 80, 82. Turns 78 tend to have a higher stress concentration due to the interfacing complex geometry. In particular, high stress is observed where end 86 of camber line rib 62 meets a fillet 94 with a radially extending side 90 of turn opening 84 formed, e.g., by another rib 60 or one of outer walls 26, 27.

FIGS. 8-18 provide cross-sectional views of a turbine rotor blade having an inner wall or rib configuration according to embodiments of the present disclosure. As noted, the configuration of ribs are used as both structural support as well as partitions that divide hollow airfoils 25 into substantially separated radially extending flow passages 40 that may be interconnected as desired to create cooling circuits. These flow passages 40 and the circuits they form are used to direct a flow of coolant through airfoil 25 in a particular manner so that its usage is targeted and more efficient. Though the examples provided herein are shown as they might be used in a turbine rotor blades 16, it will be appreciated that the same concepts also may be employed in turbine stator blades 17.

Figure 8:
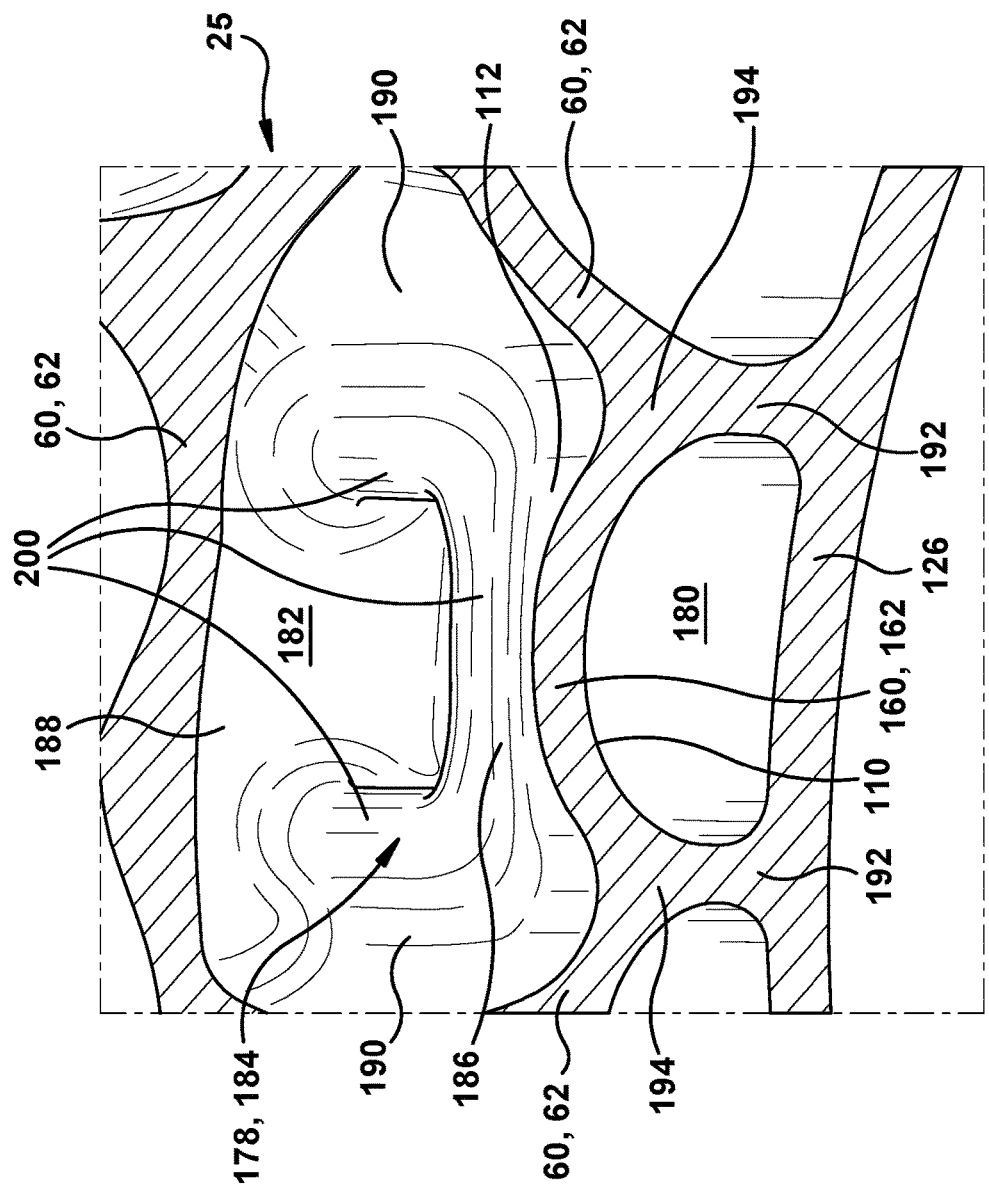
FIG. 8 shows an enlarged cross-sectional perspective view of a rib configuration and a bulbous projection according to embodiments of the disclosure taken partially along line DD in FIG. 4.

FIGS. 8-10 show one embodiment of a rib configuration according to embodiments of the disclosure. FIG. 8 shows an enlarged cross-sectional perspective view of a rib configuration according to embodiments of the disclosure taken partially along line DD in FIG. 4, i.e., looking radially outward towards end member 88. FIG. 9 shows an enlarged cross-sectional perspective view of a rib configuration according to embodiments of the disclosure taken partially along line AA in FIG. 4, i.e., looking radially inward. FIG. 10 shows an enlarged cross-sectional perspective view of a rib configuration according to embodiments of the disclosure taken along line EE in FIG. 4, i.e., looking aft at a partial lengthwise cross-section.

As illustrated, the rib configuration may provide a rib 160 partitioning the radially extending chamber into a first passage 180 on a first side 110 of rib 160 and an adjacent second passage 182 on an opposing second side 112 of rib 160. Although the teachings of the disclosure can be applied to any rib, the teachings of the disclosure are mostly shown with application to a camber line rib 162. More specifically, rib 160 includes a curved camber line rib 162 coupled at each curved end to a selected outer wall 26, 27 (26 as shown) at a fillet 192 (FIG. 8). As shown in FIG. 8, curved camber line rib 162 may also be coupled to adjacent ribs 60, e.g., adjacent camber line ribs 62, at fillets 194. Where, as illustrated, curved camber line rib 162 couples to an outer wall 26, 27, rib 162 defines first passage 180 as an outer passage between the selected outer wall 26 and curved camber line rib 162 and second passage 182 as an inner passage adjacent the outer passage. As understood, each passage 180, 182 is enclosed at an end of the radially extending chamber by an end member 188 of the radially extending chamber. While FIGS. 8-10 show a radially outward, tip end 31 (FIG. 4) of airfoil 25, similar structure may be present at a radially inward, root end 21 (FIG. 4) of airfoil 25.

The rib configuration also includes a turn 178 defined in an end 186 of rib 162 through which the coolant passes between first passage 180 and second passage 182 within end member 188 of the radially extending chamber. Turn 178 generally includes a void in end 186 of rib 162 creating a turn opening 184 between passages 180, 182 and end member 188 (FIGS. 8 and 10) through which coolant can pass between passages 180, 182. Turn opening 184 includes radially extending sides 190, created by adjacent ribs 60, 62 and/or outer walls 26, 27 to which the rib at issue couples. Although the teachings of the disclosure are described herein with a camber line rib 162 having a wavy profile, the disclosure is applicable to practically any rib, straight (FIG. 5) or curved and at any location with the rib configuration.

As shown in FIGS. 8-10, in contrast to conventional turn openings 78 (FIG. 7), the rib configuration includes a bulbous projection 200 extending along end 186 of rib 162 and on opposing radially extending sides 190 of turn opening 178. As observed best in FIG. 8, bulbous projection 200 may extend in a U-shape with an open end of the U-shape facing towards end member 188 of the radially extending chamber, i.e., radially outward. That is, bulbous projection 200 extends radially along one radially extending side 190 of turn opening 184, across end 186 of rib 162 and along the opposing radially extending side 190 in a U-shape. Here, as shown best in FIG. 8, bulbous projection 200 extends only along the U-shape and terminates into end member 188 of the radially extending chamber. Bulbous projection 200 is referred to as "bulbous" because it is generally round and bulges from rib 162. That is, rib 162 has a first thickness T1 along a length thereof, and bulbous projection 200 has a second thickness T2 greater than the first thickness. Bulbous projection 200 also projects farther from end 186 of rib 162 in selected directions more than a conventional, simply rounded end 86 (FIG. 7) of rib 62 (FIG. 7).

Bulbous projection 200 acts to move the stress typically at bottom corners of the U-shape (FIG. 7) into bulbous projection 200 and towards internal passage 182. In this fashion, turn opening 178 is distanced from fillets 194 by bulbous projection 200, reducing stress therein.

FIGS. 11-18 illustrate a number of alternative or alternative embodiments of the disclosure.

FIGS. 11 and 12 show enlarged cross-sectional views of a rib configuration according to embodiments of the disclosure taken partially along line FF in FIG. 4, i.e., looking radially outward from a root end 21 (FIG. 4) of airfoil 25. FIG. 11 is more of a close up view and FIG. 12 is from farther away. FIGS. 11 and 12 illustrate application of a bulbous projection 204 at an inward, root end 21 (FIG. 4) of airfoil 25, e.g., near or within platform 24 (FIG. 4). Further, bulbous projection 204 is positioned within a rib 160 that is a transverse rib 166, spanning between camber line ribs 62. Consequently, passages 280 and 282 coupled by turn opening 284 are both internal passages. Here, radially extending sidewalls 190 are part of camber line ribs 62, and bulbous projection 204 may be distanced farther away from fillets 192 of camber line rib 62 with outer walls 26, 27 than in FIGS. 8-10. Bulbous projection 204 moves stress into the projection rather than have it positioned in fillets 194 (FIG. 11) between transverse rib 166 and camber line ribs 62.

Figure 13:
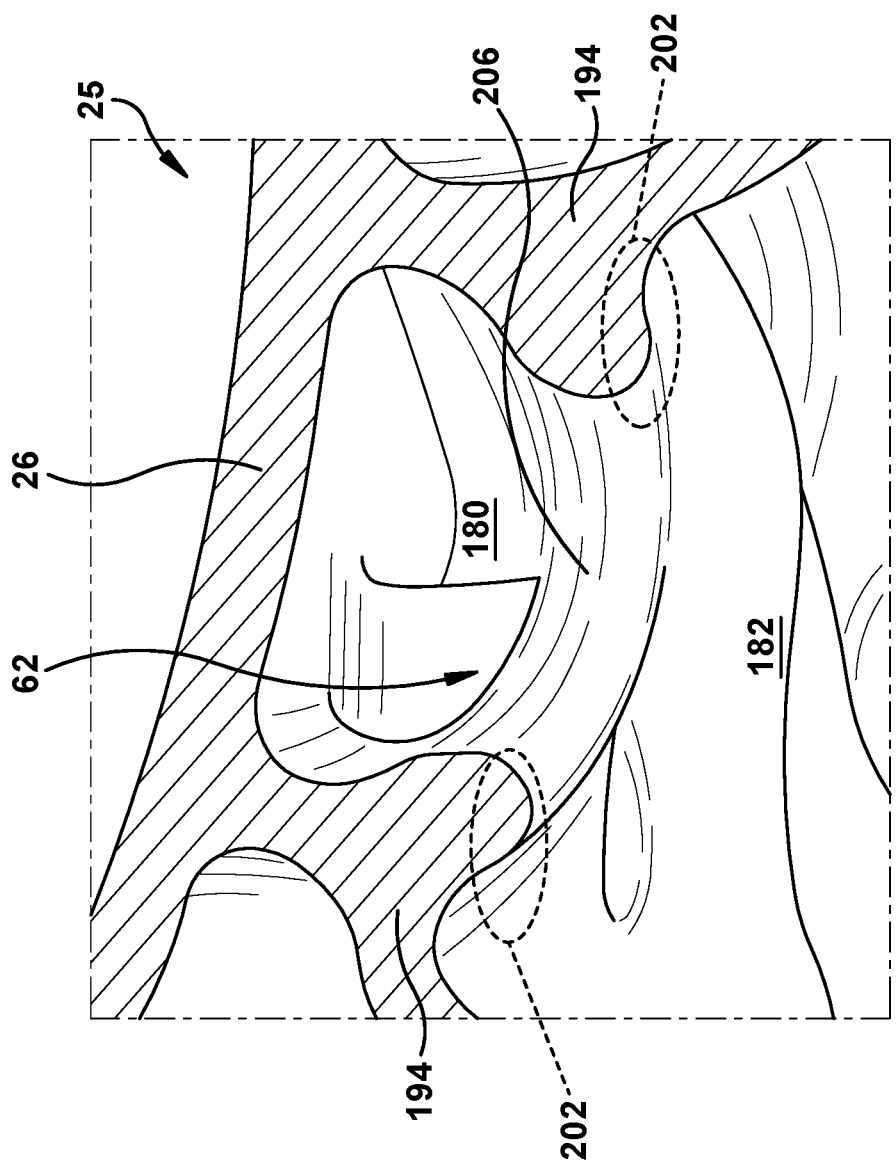
FIG. 13 shows an enlarged cross-sectional perspective view of a rib configuration and a bulbous projection according to an alternative embodiment of the disclosure taken partially along line BB in FIG. 4.

FIG. 13 shows an enlarged cross-sectional perspective view of a rib configuration including a bulbous projection 206 according to an alternative embodiment of the disclosure, and FIG. 14 shows an enlarged cross-sectional view of an embodiment of a bulbous projection 200 as may be employed in any of the embodiments described herein. The FIG. 13 cross-section is taken partially along line BB in FIG. 4, i.e., looking radially inward. FIGS. 10, 13 and 14 illustrate the alternative embodiment applicable to any embodiment of bulbous projection described herein. Here, the bulbous projection (labeled 200 in FIGS. 10, 13 and 14), in contrast to conventional rounded ends 86 (FIG. 7), includes a portion 202 extending towards one passage. FIG. 14 illustrates that the bulbous projection may have a cross-section defined by more than one radius of curvature R1, R2, which provides portion 202. In the examples shown in FIGS. 10 and 13, the passage toward which portion 202 extends is an inner passage 182, which moves stress inwardly into projection 200, 206 and portion 202. That is, portion 202 assist in distributing stress and assisting coolant flow from one passage 180, 182 to another.

Figure 16:
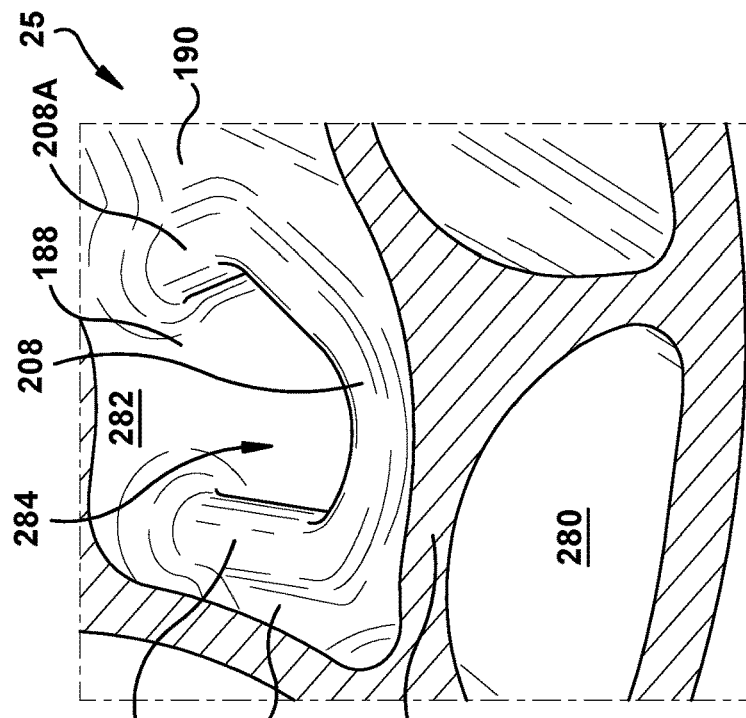
FIG. 16 shows an enlarged cross-sectional perspective view of a rib configuration and a bulbous projection according to another alternative embodiment of the disclosure taken partially along line DD in FIG. 4.
Figure 15:
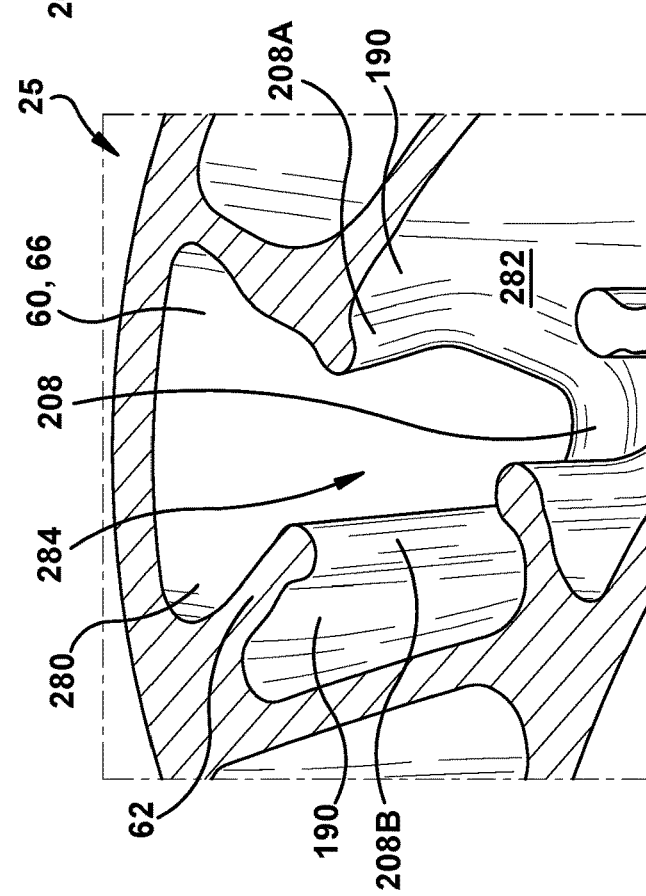
FIG. 15 shows an enlarged cross-sectional perspective view of a rib configuration and a bulbous projection according to another alternative embodiment of the disclosure taken partially along line BB in FIG. 4.

FIGS. 15 and 16 show enlarged cross-sectional perspective views of a rib configuration and a bulbous projection 208 according to another alternative embodiment of the disclosure. FIG. 15 is taken partially along line BB in FIG. 4, i.e., looking radially inward, and FIG. 16 is taken partially along line DD in FIG. 4, i.e., looking radially outward. In this embodiment, bulbous projection 208 is U-shaped, but has a first end 208A of the U-shape angled relative to a second end 208B of the U-shape. That is, ends 208A, 208B are not parallel at some portion of their lengths. In the example shown, end 208A is angled such that it also does not generally meet end member 188 of the radially extending chamber at a perpendicular angle, compared to end 208B which generally meets end member 88 at a perpendicular angle (excepting any fillet curvature).

Figure 18:
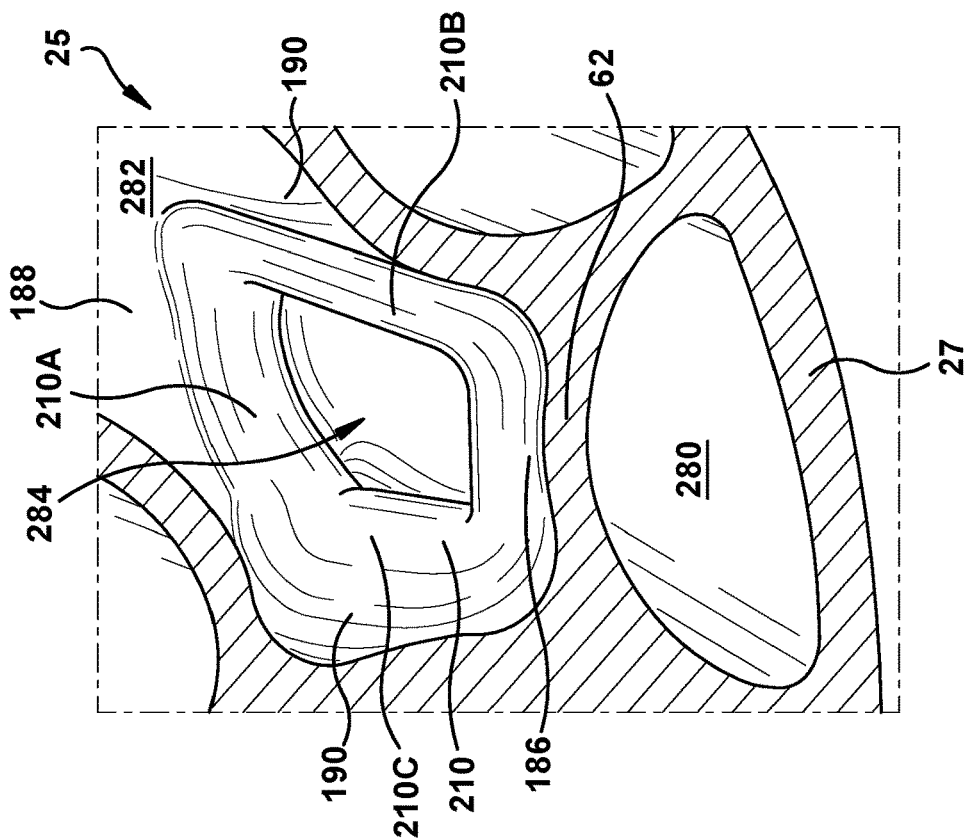
FIG. 18 shows an enlarged cross-sectional perspective view of a rib configuration and bulbous projection according to yet another alternative embodiment of the disclosure taken partially along line DD in FIG. 4.
Figure 17:
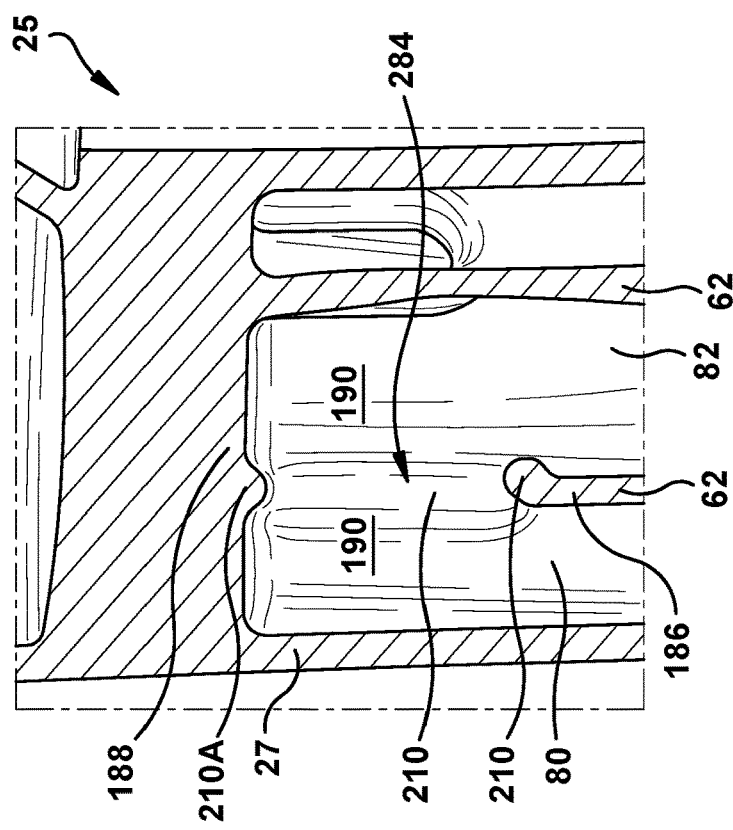
FIG. 17 shows an enlarged cross-sectional perspective view of a rib configuration and a bulbous projection according to another alternative embodiment of the disclosure taken partially along line EE in FIG. 4.

FIGS. 17 and 18 show enlarged cross-sectional perspective views of a rib configuration and a bulbous projection 210 according to another alternative embodiment of the disclosure. FIG. 17 is taken partially along line EE in FIG. 4, i.e., looking aft at a partial lengthwise cross-section, and FIG. 18 is taken partially along line DD in FIG. 4, i.e., looking radially outward. In this embodiment, bulbous projection 210 further extends along end member 188 (extent 210A) of the radially extending chamber between opposing radially extending sides 190 of turn opening 284. In this fashion, bulbous projection 210 (with extent 210A) is contiguous about turn opening 284 and acts to additional move stress out of end member 188 into the projection. FIG. 18 shows another embodiment where the U-shape has one side 210B angled relative to another side 210C. Side 210B does not meet end member 188 perpendicularly, while side 210A generally meets end member 188 perpendicularly (excepting interjection of fillet curvatures and extent 210A).

Bulbous projections as described herein protects outer to inner and inner to outer turn openings resulting in lower impact of stress concentration in the vicinity of the turn, which allows for more complex multi-wall rib configurations. For example, bulbous projections address high camber line rib stresses present along the inner passage faces by contouring the turn openings to shield the turn from these high stresses. While particular embodiments have been described herein, it is emphasized that any of the embodiments may be used separately or together in any combination, and may be employed at either end of the airfoil.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Alternative" or "alternatively" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A blade comprising an airfoil defined by a concave pressure side outer wall and a convex suction side outer wall that connect along leading and trailing edges and, therebetween, form a radially extending chamber for receiving the flow of a coolant, the blade further comprising:
   a rib configuration including:
      a rib partitioning the radially extending chamber into a first passage on a first side of the rib and an adjacent second passage on an opposing second side of the rib, each passage enclosed at an end of the radially extending chamber by an end member of the radially extending chamber, and
      a turn opening defined in an end of the rib through which the coolant passes between the first passage and the second passage within the end member of the radially extending chamber; and
   a bulbous projection extending along the end of the rib and on opposing radially extending sides of the turn opening.

2. The blade of claim 1, wherein the bulbous projection extends in a U-shape, an open end of the U-shape facing towards the end member of the radially extending chamber.

3. The blade of claim 2, wherein the bulbous projection extends only along the U-shape and terminates into the end member of the radially extending chamber.

4. The blade of claim 2, wherein a first end of the U-shape is angled relative to a second end of the U-shape.

5. The blade of claim 1, wherein the bulbous projection further extends along the end member of the radially extending chamber between the opposing radially extending sides of the turn opening.

6. The blade of claim 1, wherein the rib has a first thickness along a length thereof, and the bulbous projection has a second thickness greater than the first thickness.

7. The blade of claim 1, wherein the rib includes a curved camber line rib coupled at each end to a selected outer wall at a fillet, the curved camber line rib defining the first passage as an outer passage between the selected outer wall and the curved camber line rib and the second passage as an inner passage adjacent the outer passage,
  wherein the turn opening is distanced from the fillet by the bulbous projection.

8. The blade of claim 7, wherein the curved camber line rib has a wavy profile.

9. The blade of claim 7, wherein the bulbous projection includes a portion extending towards the inner passage.

10. The blade of claim 1, wherein the bulbous projection has a cross-section defined by more than one radius of curvature.

11. The blade of claim 1, wherein the blade comprises one of a turbine rotor blade and a turbine stator blade.

12. A turbine rotor blade comprising an airfoil defined by a concave pressure side outer wall and a convex suction side outer wall that connect along leading and trailing edges and, therebetween, form a radially extending chamber for receiving the flow of a coolant, the turbine rotor blade further comprising:
  a rib configuration including:
    a rib partitioning the radially extending chamber into a first passage on a first side of the rib and an adjacent second passage on an opposing second side of the rib, each passage enclosed at an end of the radially extending chamber by an end member of the radially extending chamber; and
    a turn opening defined in an end of the rib through which the coolant passes between the first passage and the second passage within the end member of the radially extending chamber; and
  a bulbous projection extending along the end of the rib and on opposing radially extending sides of the turn opening.

13. The turbine blade of claim 12, wherein the bulbous projection extends in a U-shape, an open end of the U-shape facing towards the end member of the radially extending chamber.

14. The turbine rotor blade of claim 13, wherein the bulbous projection extends only along the U-shape and terminates into the end member of the radially extending chamber.

15. The turbine rotor blade of claim 13, wherein a first end of the U-shape is angled relative to a second end of the U-shape.

16. The turbine rotor blade of claim 12, wherein the bulbous projection further extends along the end member of the radially extending chamber between the opposing radially extending sides of the turn opening.

17. The turbine rotor blade of claim 12, wherein the rib has a first thickness along a length thereof, and the bulbous projection has a second thickness greater than the first thickness.

18. The turbine rotor blade of claim 12, wherein the rib includes a curved camber line rib coupled at each end to a selected outer wall at a fillet, the curved camber line rib defining the first passage as an outer passage between the selected outer wall and the curved camber line rib and the second passage as an inner passage adjacent the outer passage,
  wherein the turn opening is distanced from the fillets by the bulbous projection.

19. The turbine rotor blade of claim 18, wherein the bulbous projection includes a portion extending towards the inner passage.

20. The turbine rotor blade of claim 12, wherein the bulbous projection has a cross-section defined by more than one radius of curvature.

* * * * *